(12) United States Patent
Haag

(10) Patent No.: US 10,922,278 B2
(45) Date of Patent: Feb. 16, 2021

(54) SYSTEMS AND METHODS FOR DATABASE COMPRESSION AND EVALUATION

(71) Applicant: Albert Haag, Bad Duerkheim (DE)

(72) Inventor: Albert Haag, Bad Duerkheim (DE)

( * ) Notice: Subject to any disclaimer, the term of this patent is extended or adjusted under 35 U.S.C. 154(b) by 166 days.

(21) Appl. No.: 16/317,651

(22) PCT Filed: Jul. 24, 2017

(86) PCT No.: PCT/IB2017/001071
§ 371 (c)(1),
(2) Date: Jan. 14, 2019

(87) PCT Pub. No.: WO2018/015814
PCT Pub. Date: Jan. 25, 2018

(65) Prior Publication Data
US 2019/0227994 A1 Jul. 25, 2019

Related U.S. Application Data

(60) Provisional application No. 62/365,907, filed on Jul. 22, 2016.

(51) Int. Cl.
*G06F 16/00* (2019.01)
*G06F 16/174* (2019.01)
*G06F 16/245* (2019.01)
*G06F 16/22* (2019.01)

(52) U.S. Cl.
CPC .......... *G06F 16/1744* (2019.01); *G06F 16/22* (2019.01); *G06F 16/2272* (2019.01); *G06F 16/245* (2019.01)

(58) Field of Classification Search
CPC .. G06F 16/1744; G06F 16/22; G06F 16/2272; G06F 16/245; G06F 16/174; G06F 16/00; G06F 17/30; G06F 16/217; G06F 16/27; G06F 16/21; G06F 16/2282; G06F 11/3409; G06F 16/951; G06F 17/18; G06F 17/277; G06F 17/30864; G06F 40/284; G06F 40/258; G06F 40/44; G06K 9/6267; G06Q 10/04
See application file for complete search history.

(56) References Cited

U.S. PATENT DOCUMENTS 5,160,554 A * 11/1992 Bania ...................... C22C 14/00
148/407
5,410,353 A * 4/1995 Cerda ...................... G06K 9/20
348/180

(Continued)

OTHER PUBLICATIONS

Albert Haag: Column Oriented Compilation of Variant Tables. Proceedings of the 17th International Configuration Workshop, Vienna, AT, Sep. 10, 2015, pp. 89-96.

(Continued)

*Primary Examiner* — Anh Ly
(74) *Attorney, Agent, or Firm* — Faegre Drinker Biddle & Reath LLP

(57) ABSTRACT

Systems and methods for increasing computing efficiency include a compiler configured to compress a variant table into a variant decomposition diagram (VDD). VDDs are compact representations of one or more variant tables and comprise a series of nodes and links that can be used to evaluate (e.g., filter, iterate, access) the variant table.

16 Claims, 8 Drawing Sheets

(56) References Cited

U.S. PATENT DOCUMENTS

| | | | | |
|---|---|---|---|---|
| 6,058,373 | A * | 5/2000 | Blinn | G06Q 10/087 |
| | | | | 705/22 |
| 10,255,641 | B1 * | 4/2019 | Goldman | G06Q 40/123 |
| 2005/0050426 | A1 * | 3/2005 | Andreev | H03M 13/2771 |
| | | | | 714/755 |
| 2007/0255694 | A1 * | 11/2007 | Wu | G06F 16/951 |
| 2008/0127000 | A1 * | 5/2008 | Majumder | G06F 30/327 |
| | | | | 716/113 |
| 2009/0300510 | A1 * | 12/2009 | Gantman | G06F 9/452 |
| | | | | 715/740 |
| 2010/0131565 | A1 * | 5/2010 | Weinberg | G06F 16/288 |
| | | | | 707/802 |
| 2011/0264666 | A1 * | 10/2011 | Gieseke | G06F 16/2228 |
| | | | | 707/741 |
| 2013/0124466 | A1 * | 5/2013 | Naidu | G06F 16/235 |
| | | | | 707/610 |
| 2014/0279838 | A1 * | 9/2014 | Tsirogiannis | G06F 16/22 |
| | | | | 707/603 |
| 2015/0120490 | A1 * | 4/2015 | Subbarayan | G06Q 30/0621 |
| | | | | 705/26.5 |
| 2015/0339417 | A1 * | 11/2015 | Garcia-Ramirez | G06F 17/16 |
| | | | | 703/2 |
| 2015/0379442 | A1 * | 12/2015 | Samanthapudi | G06Q 10/0633 |
| | | | | 705/7.27 |
| 2016/0304299 | A1 * | 10/2016 | Daun | G09B 5/125 |

OTHER PUBLICATIONS

International Search Report and Written Opinion issued in PCT/IB2017/001071, dated Nov. 14, 2017, 13 pages.

\* cited by examiner

| Style | Fabric | Size | Color | Imprint | Imprint Color | Price(USD) |
|---|---|---|---|---|---|---|
| Standard | Cotton | Small | Black | *MIB* | White | 9.99 |
| Standard | Cotton | Medium | Black | *MIB* | White | 9.99 |
| Standard | Cotton | Large | Black | *MIB* | White | 9.99 |
| Standard | Cotton | Medium | Black | STW | Green | 9.99 |
| Standard | Cotton | Large | Black | STW | Green | 9.99 |
| Standard | Cotton | Medium | White | STW | Green | 9.99 |
| Standard | Cotton | Large | White | STW | Green | 9.99 |
| Standard | Cotton | Medium | Red | STW | Green | 9.99 |
| Standard | Cotton | Large | Red | STW | Green | 9.99 |
| Standard | Cotton | Medium | Blue | STW | Green | 9.99 |
| Standard | Cotton | Large | Blue | STW | Green | 9.99 |

FIG. 2

| Print | Size | Color |
|---|---|---|
| MIB | Large | Black |
| MIB | Medium | Black |
| MIB | Small | Black |
| STW | Large | Black |
| STW | Large | Blue |
| STW | Large | Red |
| STW | Large | White |
| STW | Medium | Black |
| STW | Medium | Blue |
| STW | Medium | Red |
| STW | Medium | White |

FIG. 3

| Color | Size | Print |
|---|---|---|
| Black | Small | STW (Save the Whales) |
| Red | Small | MIB (Men in Black) |
| Red | Medium | MIB |
| Red | Large | MIB |
| Red | Small | STW |
| White | Small | MIB |
| White | Medium | MIB |
| White | Large | MIB |
| White | Small | STW |
| Blue | Small | MIB |
| Blue | Medium | MIB |
| Blue | Large | MIB |
| Blue | Small | STW |

SYSTEMS AND METHODS FOR DATABASE COMPRESSION AND EVALUATION

RELATED APPLICATIONS

This application claims the benefit of U.S. Provisional Patent Application No. 62/365,907, filed on Jul. 22, 2016, and the content of such application is hereby incorporated by reference in its entirety for all purposes.

TECHNICAL FIELD

Certain embodiments of the present disclosure are directed to improved computational systems focusing on enhanced database tables (e.g., data tables, variant tables). In particular, certain embodiments of the present disclosure utilize various decomposition and/or evaluation approaches for database tables, which lead to increased speed and efficiencies for the underlying computational systems. These approaches feature what is referred to as variant decomposition (or decision) diagrams (VDDs). Although portions of the disclosure describe VDDs in the context of tables for variants of products, aspects of the present disclosure are useful in many types of databases, including those involving large tables.

BACKGROUND

Current computing endeavors often require large amounts of data. For example, offering mass customization of products to customers involves being able to keep track of and produce a large number of unique product variations. As a basic example, a business may offer their customers the ability to build a customized t-shirt by allowing the customers to select from a predetermined list of features (e.g., characteristics)—with each unique combination of features referred to as a variant. These variants share a common basic structure (e.g., a basic t-shirt), but with individually differing features (e.g., color, size, cut, fabric). Individualized features can be described by assigning a value (e.g., a string or number) or word (e.g., cotton, polyester) to each feature.

The product variants can be represented in a data table where each column of the data table corresponds to a feature and each row in the data table represents a combination of features (e.g., a red shirt that is a size large and made of cotton). Such a data table is an example of what this disclosure refers to as a variant table, which lists permissible combinations of features. For example, a variant table that is used for keeping track of products can be used to constrain customizability (e.g., restrict the number of unique products available to customers) and/or used to filter out inadmissible combinations of features in an interactive customization process (e.g., showing and providing available customizations to a customer). Because of their size, uncompressed variant tables can become difficult to work with and/or breach the limits of spreadsheet programs. Thus, using uncompressed variant tables can require allocating significant amounts of computing resources (including time, processing speed, power, etc.).

In other words, conventional approaches for organizing and using large amounts of data relied on uncompressed variant tables, causing the underlying systems to require larger amounts of computing resources that, in some situations, could exceed the amount of available resources. Although some compression techniques have been proposed, such as binary decision diagrams (BDDs) and multi-valued decision diagrams (MDDs), these approaches are not tailored for the task of compressing individual tables. In particular, BDDs will have more nodes (discussed in more detail below) when representing a variant table than a VDD. MDDs are non-binary and are more complex to implement. VDDs, as discussed herein, are more efficient and more applicable than the other compression approaches.

Embodiments of the present disclosure provide improved data compression techniques that reduce the computing resources needed to efficiently access and process large amounts of data. As a result, these embodiments can be used across more platforms, including those with limited processing resources such as smartphones, as well as providing increased speed and efficiencies.

SUMMARY

Accordingly, certain embodiments of the present disclosure are directed to various approaches to decompose data tables and to evaluate the decomposed data tables. The decomposed data tables can be considered to be compressed representations of the data table. These compressed data tables maintain the benefits of an uncompressed data table (e.g., relationships among data) while being easier to read and faster to evaluate, manipulate, and/or deploy. These embodiments utilize VDDs, which are a compact representation of a data table and which comprise a series of nodes and links that can be used to evaluate (e.g., filter, iterate, access) the data table. Thus, the use of these decomposed data tables in these embodiments enables computer-based systems to more efficiently organize the underlying data, leading to faster and more efficient systems.

In certain embodiments, a processor-based method is disclosed for increasing computing efficiency by compressing a data table. The data table includes a plurality of columns, a plurality of rows, and a plurality of cells—with each of the plurality of cells having a value. The method includes decomposing the data table into a root node and a plurality of subtables, using one or more processors. The root node comprises each of the plurality of cells having a first value. Decomposing the table into the plurality of subtables includes decomposing the table into a first subtable comprising the plurality of rows that do not comprise the first value and decomposing the table into a second subtable comprising cells not within the root node and the first subtable.

The method of the previous paragraph may further include determining, using the one or more processors, a number of unique values existing in each of the plurality of columns in the data table. The first value may comprise one of the values in the column with the least number of unique values.

The method of the previous paragraphs may further include the first value being a value occurring first in the column with the least number of unique values.

The method of the previous paragraphs may further include recursively decomposing the data table into subtables until no additional subtables can be generated.

The method of the previous paragraphs may further include the data table being decomposed based on an order of the plurality of columns.

The method of the previous paragraphs may further include the data table being decomposed to a variant decomposition diagram (VDD).

The method of the previous paragraphs may further include the VDD comprising a series of nodes and links.

The method of the previous paragraphs may further include adding a column to the plurality of columns in the data table and decomposing the data table to generate an updated VDD.

The method of the previous paragraphs may further include the data table including a plurality of c-tuples.

In certain embodiments, a system is disclosed for improving computational efficiency by compressing a variant table. The system includes a tangible, non-transitory computer readable medium having the variant table stored thereon. The variant table includes a plurality of columns, a plurality of rows, and a plurality of cells—with each of the plurality of cells having a value. The system further includes a compiler configured to decompose the variant table into a plurality of subtables by decomposing the variant table into a first subtable and a second subtable. The first subtable includes the plurality of rows that do not comprise a first value, and the second subtable includes cells not within the first subtable and that do not contain the first value.

In certain embodiments, a system includes a memory having a variant table stored thereon and a compiler configured to compress the variant table into a VDD, which includes plurality of nodes and links.

The system of the previous paragraph may further include the compiler being configured to compress the variant table into the VDD by recursively decomposing the variant table into a plurality of subtables.

The system of the previous paragraphs may further include the compiler being configured to compress the VDD into a negative VDD.

The system of the previous paragraphs may further include the VDD being stored on the memory.

The system of the previous paragraphs may further include the variant table comprising a plurality of c-tuples.

The system of the previous paragraphs may further include the VDD including a plurality of set-labeled nodes.

In certain embodiments, a processor-based method for increasing computing efficiency is disclosed. The method includes compressing a data table into a VDD, which comprises a series of nodes and links. The method further includes filtering the VDD to generate a VDD result set (VRS) and communicating the VRS to a client application.

In certain embodiments, a method comprises negating a variant decomposition diagram (VDD) to generate a negative VDD.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

BRIEF DESCRIPTION OF THE DRAWINGS

FIG. 2 shows an uncompressed variant table, in accordance with certain embodiments of the present disclosure.

FIG. 3 shows a simplified version of the variant table of FIG. 2, in accordance with certain embodiments of the present disclosure.

FIG. 7 shows an uncompressed negative variant table, in accordance with certain embodiments of the present disclosure.

DETAILED DESCRIPTION

In some embodiments, a variant decomposition diagram (VDD) comprises a series of nodes and links that represent an uncompressed variant table. In other words, a VDD is a compact representation of a variant table—a compressed variant table. VDDs maintain the benefits of and core functionalities expected with an uncompressed table (e.g., a database, spreadsheet) while being faster to evaluate, manipulate, and deploy. For example, like a conventional database or spreadsheet, the VDDs can be searched, filtered, counted, ordered, iterated, exported/imported (e.g., as a spreadsheet, database), directly accessed (including to the n-th row), and/or otherwise evaluated—but these operations can be performed on VDDs more quickly than on a conventional database or spreadsheet.

As described in more detail below, the compression techniques discussed below create a VDD with fewer nodes for a given variant table. Use of such VDDs and related techniques described herein results in improvements in computing power usage and computation speed compared to use of conventional database structures. VDDs are thus more useful for practical, real-time applications, as well as in applications that have more limited processing resources (e.g., mobile phones). Thus, the various embodiments described herein provide several distinct advantages over existing database structures and techniques.

Figure 1:
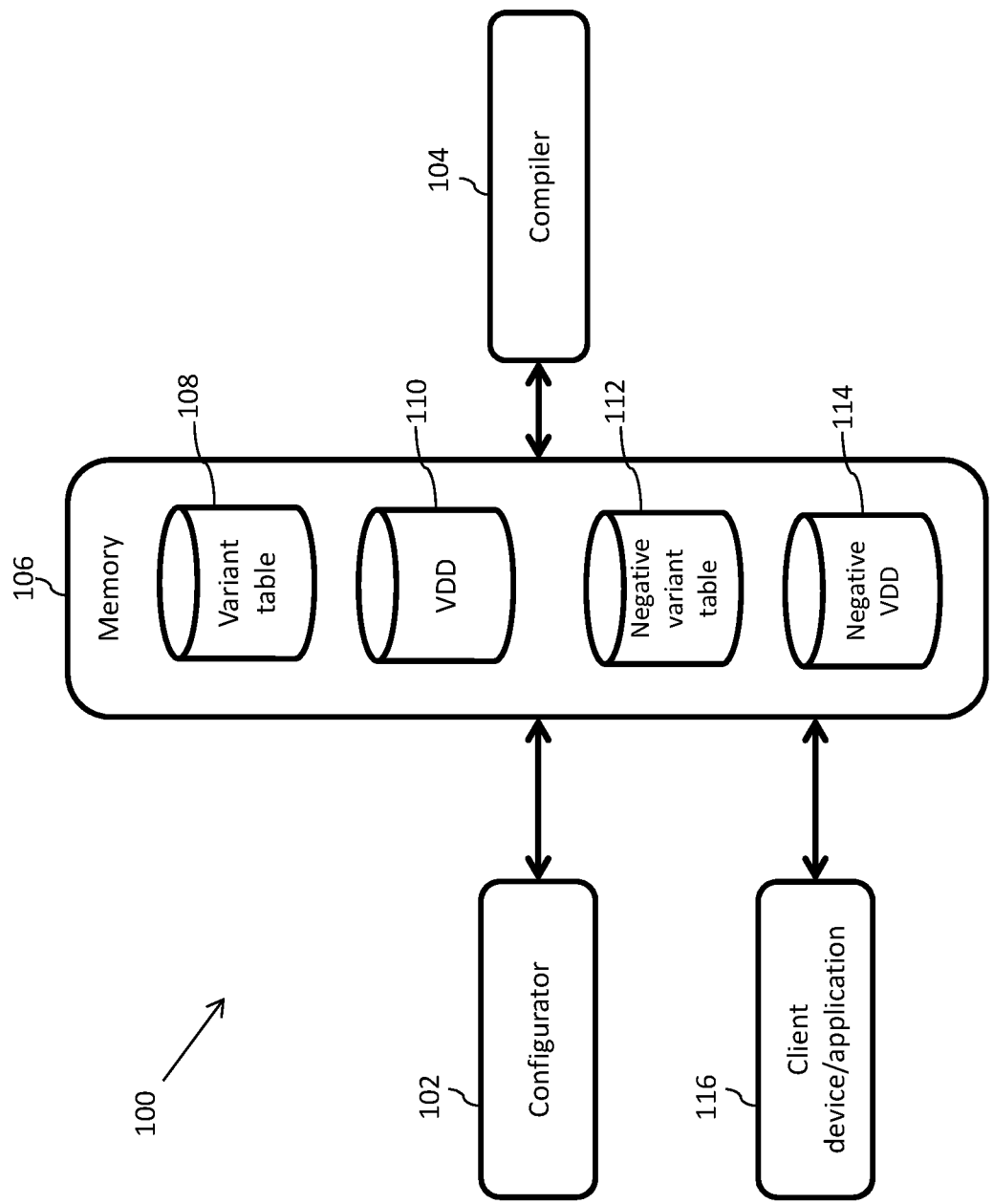
FIG. 1 shows a block representation of a system utilizing VDDs, in accordance with certain embodiments of the present disclosure.

FIG. 1 shows a block representation of an exemplary system 100 including a configurator 102, a compiler 104, and a memory 106. The memory 106 includes a variant table 108, a VDD 110, a negative variant table 112, and a negative VDD 114. The uncompressed variant table 108 and the uncompressed negative variant table 112 can be stored in the memory 106 in a format such as a file (e.g., .csv) in a zip archive, a conventional database, or as a list of c-tuples (discussed in more detail below). The VDD 110 and the negative VDD 114 can be stored in the memory 106 as a binary format in a zip archive or other form of storage. The configurator 102 is configured to access the variant table 108, the VDD 110, the negative variant table 112, and/or the negative VDD 114. The compiler 104 is configured to compress the variant table 110 to the VDD 110 and/or compress the negative variant table 112 into the negative VDD 114. Although only one variant table, VDD, negative variant table, and negative VDD is shown in FIG. 1, the system 100 can include multiple variant tables and multiple negative variant tables, which can be compressed into separate VDDs and negative VDDs, respectively, by the compiler 104 and used by the configurator 102. Further, multiple VDDs and negative VDDs can be joined (e.g., melded, combined) to generate a single VDD or negative VDD that represents the equi-join of the multiple variant tables (which is similar to an equi-join of relational tables). In certain embodiments, the memory 106 is a component of a server and/or client device or application utilizing one or more processors. The client device or application 116 may access the variant table 108, the VDD 110, the negative variant table 112, and/or the negative VDD 114 directly from the memory 106 (which hosts the tables and VDDs). Alternatively, or additionally, the variant table 108, the VDD 110, the negative variant table 112, and/or the negative VDD 114 may be sent directly to the client device or application 116 for storage thereon.

The various components described herein may be implemented using firmware, integrated circuits, and/or software modules that interact with each other or are combined together. The methods and processes disclosed herein may be carried out via computer-readable instructions/code for execution by the compiler 104. Such instructions may be stored on a non-transitory computer-readable medium (e.g., the memory 106) and transferred to the compiler 104 for execution. The components, tables, structures, and methods described herein are only a representative example of embodiments that can be used to provide the described functions.

As one example, FIG. 2 shows an uncompressed variant table 200 for a customizable t-shirt. The variant table 200 includes a plurality of columns 202 each representing a different feature of the t-shirt. For example, the variant table shows columns for various features each with one or more values: style (i.e., Standard), fabric (i.e., Cotton), size (i.e., Small, Medium, and Large), color (i.e., Black, White, Red, or Blue), imprint (i.e., MIB or STW), imprint/color (i.e., White or Green), and price (i.e., $9.99). Each cell 204 in the plurality of columns 202 includes a value (e.g., Red, MIB, or Small). The variant table 200 also includes a plurality of rows 206 that represent a unique combination of features (e.g., a Black, Cotton t-shirt that is a size Small with a White, MIB imprint and that costs $9.99). Note that the variant table 200 need not include every possible combination of the various features. For example, the variant table 200 is constrained such that imprints for MIB are only available for the color White and STW imprints do not fit on t-shirts that are a size Small. As such, the variant table 200 may only list valid variants.

Increasing the number of features and/or different values for each feature can result in the variant table 200 becoming increasingly large and complex. For example, the number of rows in the variant table 200 will expand substantially if additional options are made available such as three fabrics (i.e., cotton, synthetic, and mixed), three styles (i.e., no sleeve, half sleeve, and full sleeve), and five sizes (i.e., extra small, extra-large, extra-extra-large, 3T, 4T).

Large variant tables consume large amounts of storage and require a large amount of computing power, computing time, and/or initial programming to manipulate, evaluate, and the like. For example, large variant tables can be too unwieldy for practical, real-time applications such as showing and providing available customizations to a customer in an interactive, real-time setting or on platforms with limited computing resources (such as mobile phones). For example, to provide an interactive menu, a customer may be presented with a menu or set of menus with all of the available features for a product (e.g., a t-shirt with an available combination of features). The menu(s) can be dynamically updated with available features as the customer chooses or excludes other features, which can be chosen, etc., in any order. However, with a large variant table, it may not be possible to update the menu(s) quick enough to be considered an acceptable customer experience. The present disclosure addresses such issues, among others, by compressing a variant table into a VDD via a recursive decomposition process. As discussed herein, VDDs are more agile than a conventional database or variant table.

Figure 4:
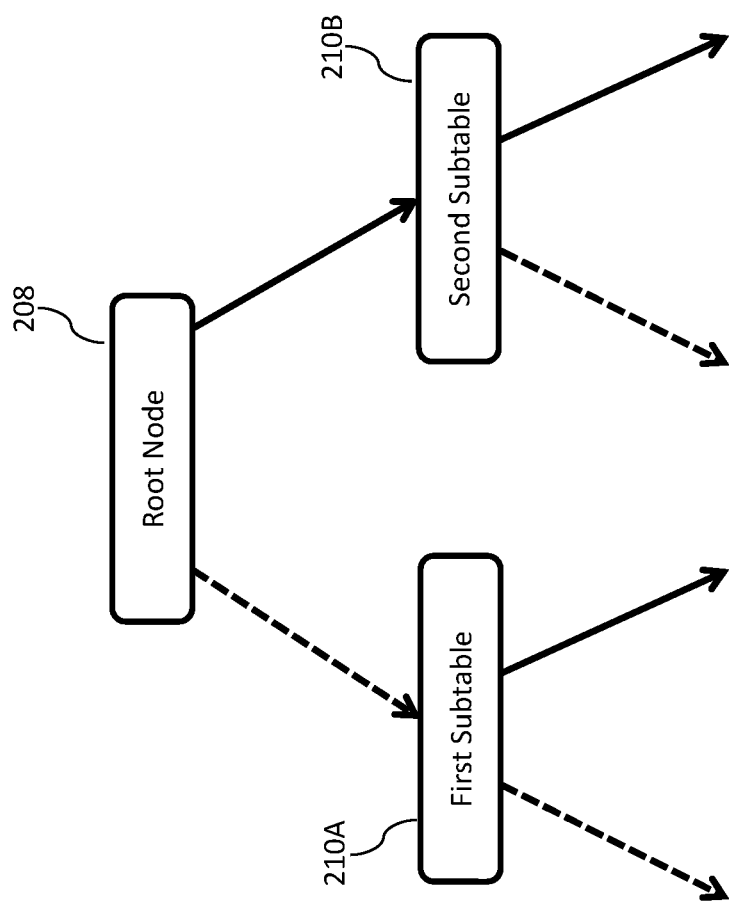
FIG. 4 shows a block representation of subtables of the variant table of FIG. 3, in accordance with certain embodiments of the present disclosure.

FIGS. 3 and 4 outline an approach for decomposing the variant table 200 to compress the variant table 200 into a VDD. FIG. 3 shows a simplified version of the variant table 200 of FIG. 2, and FIG. 4 graphically represents the process of decomposing the variant table 200. A VDD's size for a given variant table depends on an order of the decomposition decisions. The disclosed decomposition approaches result in high compression and fast compilation of variant tables. As such, a VDD can be quickly generated after a change to content of the underlying variant table and/or quickly evaluated, demonstrating improvements over conventional databases.

As shown in FIG. 3, the exemplary variant table 200 shows three columns: an imprint column 202A, a size column 202B, and a color column 202C. The variant table 200 includes cells 204—each with a single value—and a plurality of rows 206. For simplicity of explaining the decomposition methods, the variant table 200 in FIG. 3 is shown as being sorted in a particular order. But, the disclosed decomposition approaches are not reliant on how a variant table itself is ordered. Instead, the disclosed decomposition approaches can be applied to an unordered variant table. For example, the disclosed decomposition approaches can be carried out by a compiler (such as the compiler 104 of the system 100 of FIG. 1) independent of the variant table's order (e.g., the order of values in the plurality of columns 202 and the plurality of rows 206). In certain embodiments, the decomposition methods simply follow the order in which the plurality of columns 202 is ordered in the original variant table or as desired by a user.

Figure 5:
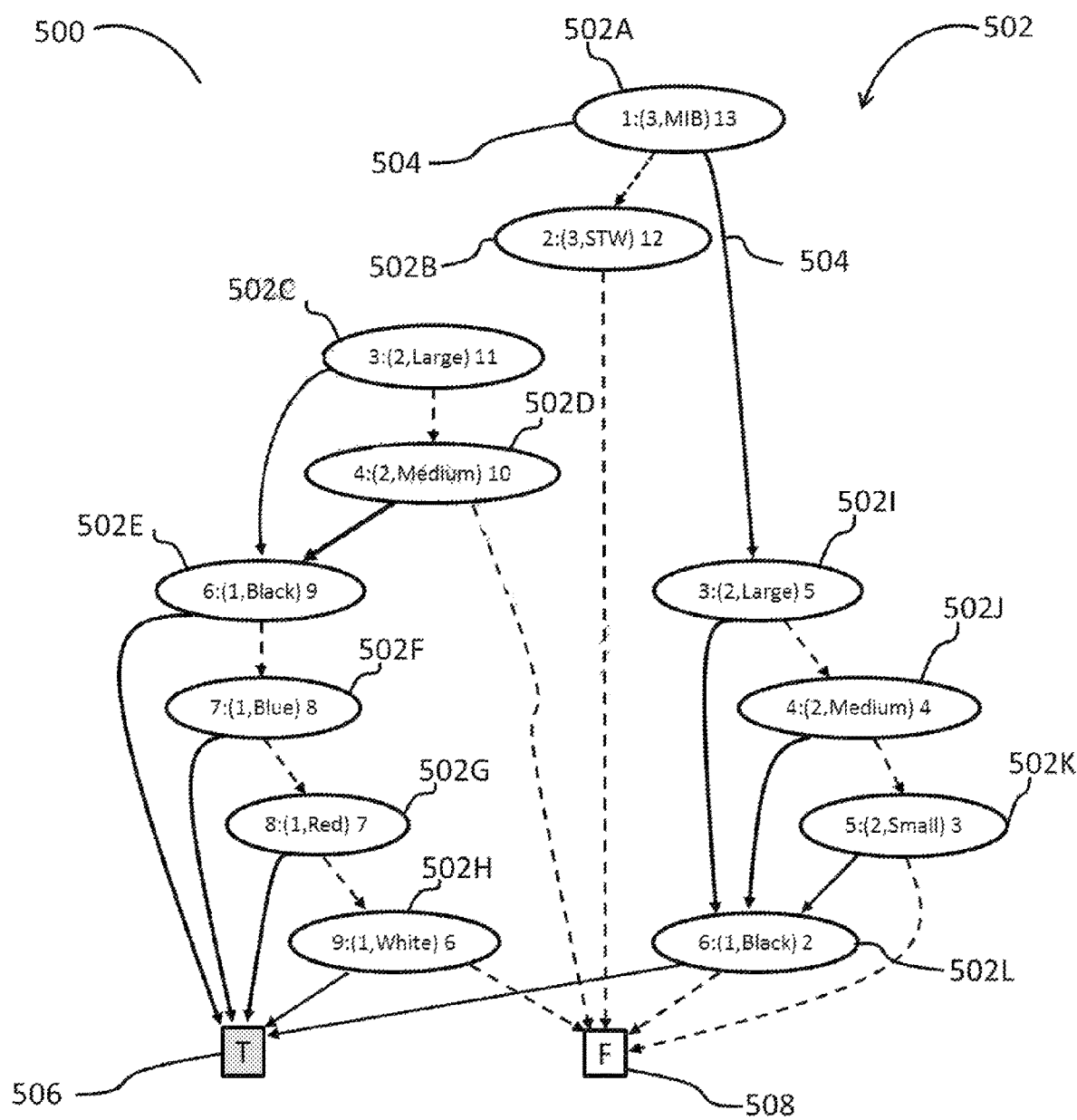
FIG. 5 shows a decision diagram of a VDD of the variant table of FIG. 3, in accordance with certain embodiments of the present disclosure.

The methods involve decomposing the variant table 200 into subtables by the compiler 104. The goal of decomposing the variant table 200 is to generate a VDD that represents the variant table 200 by a series of nodes and links such that the nodes and links can be used to evaluate, access, etc., the variant table 200. FIG. 5 shows a graphical representation of a VDD 500 generated for the variant table 200. As will be explained below, the nodes and the links are identified through the decomposition process.

Determining the order of decomposing the variant table 200 into subtables includes determining the number of unique values existing in each of the plurality of columns 202 of the variant table 200. For example, for the variant table 200 of FIG. 3, the compiler 102 can determine that the imprint column 202A includes only two unique values (i.e., MIB and STW), the size column 202B includes three unique values (i.e., Small, Medium, and Large), and the color column 202C includes four unique values (i.e., Black, Blue, Red, and White).

The compiler 102 uses the unique-value determination to identify a root node 208, which is a representation of the variant table 200. The root node 208 includes cells 204 that have one of the values in the column with the least number of unique values. In FIG. 3, the imprint column 202A includes the least amount of unique values. And, as shown in FIG. 3, the root node 208 includes the cells 204 that include the MIB imprint, which is the first value listed in the imprint column 202A. In some embodiments, the compiler could have used the STW imprint values for the root note 208, although it is convenient in some situations to just choose the first value in the column with the least number of unique values.

The compiler 102 then decomposes the variant table 200 into two subtables: a first subtable 210A and a second subtable 210B. The first subtable 210A includes the plurality of rows 206 that do not include the first value (i.e., the rows without the MIB imprint). These rows 206 can be referred to as a left child subtable, and, in FIG. 4, are shown connected to the root node 208 by a dotted line. The second subtable 210B includes cells 204 that are not within the root node 208 and the first subtable 210A. These cells 204 can be referred to as a right child subtable, and, in FIG. 4, are shown connected to the root node 208 by a solid line.

Each subtable can be further decomposed by determining whether either or both of the subtables (i.e., the first subtable 210A and the second subtable 210B) can be decomposed further into one or two subtables. If the subtable has only one column, the resulting subtable is a left child subtable that contains all of the values from the single column except for the value chosen for decomposition. The right child subtable (e.g., a single column subtable) is considered to be empty because no values remain using the proposed decomposition process. It follows that a subtable cannot be further decomposed (i.e., the right child subtable and the left child subtable are empty) if a subtable only includes a single unique value. The decomposition process outlined above (e.g., choosing a first value in a column with the least number of unique values, and so on) can be carried out recursively on the variant table 200 until no more subtables can be further decomposed.

The decomposed variant table (i.e., a compressed variant table) is graphically represented in FIG. 5 as a VDD 500. The VDD 500 includes nodes 502 (i.e., nodes 502A-L) and links 504 between the nodes 502. Various links 504 lead to a first sink 506 (noted with a "T" for "TRUE) and a second sink 508 (noted with an "F" for FALSE). The VDD 500 can be considered to be a form of a rooted binary directed acyclic graph where two links 504 extend from each node 502. In FIG. 5, subtables created during the decomposition process that are identical and that have identical child subtables can be represented by a single node 502. In other words, multiple occurrences of identical subtables share a node 502. For example, in FIG. 5, the nodes 502E and 502L are shared nodes with respect to the VDD 500.

The nodes 502 are labeled by a naming convention where the first number in a node label is the variable number (e.g., encodes column and value) and the last number is the node number. The nodes can be labeled with a combination of discrete numeric sets, numeric intervals, symbolic intervals (e.g., (a-z)), a wild card symbol "*" (including partial wild card expressions (such as a regular expression for a string)) to designate any value.

It has been found that, reducing the number of nodes in a VDD, leads to a further compressed variant table. Reducing the number of nodes may result in quicker evaluation (discussed in more detail below) of a variant table. The decomposition process discussed above is simple, fast, and consistently results in a compressed VDD for a given variant table. It has been found to be a better compression approach than other static compression approaches, for example, when applied to variant tables from actual product models. A static approach is one that is defined without knowing the table beforehand, whereas a dynamic approach searches for an optimal ordering of decomposition decisions for a given table. The number of nodes 502 in the VDD 500 can be further reduced as discussed immediately below.

Figure 6:
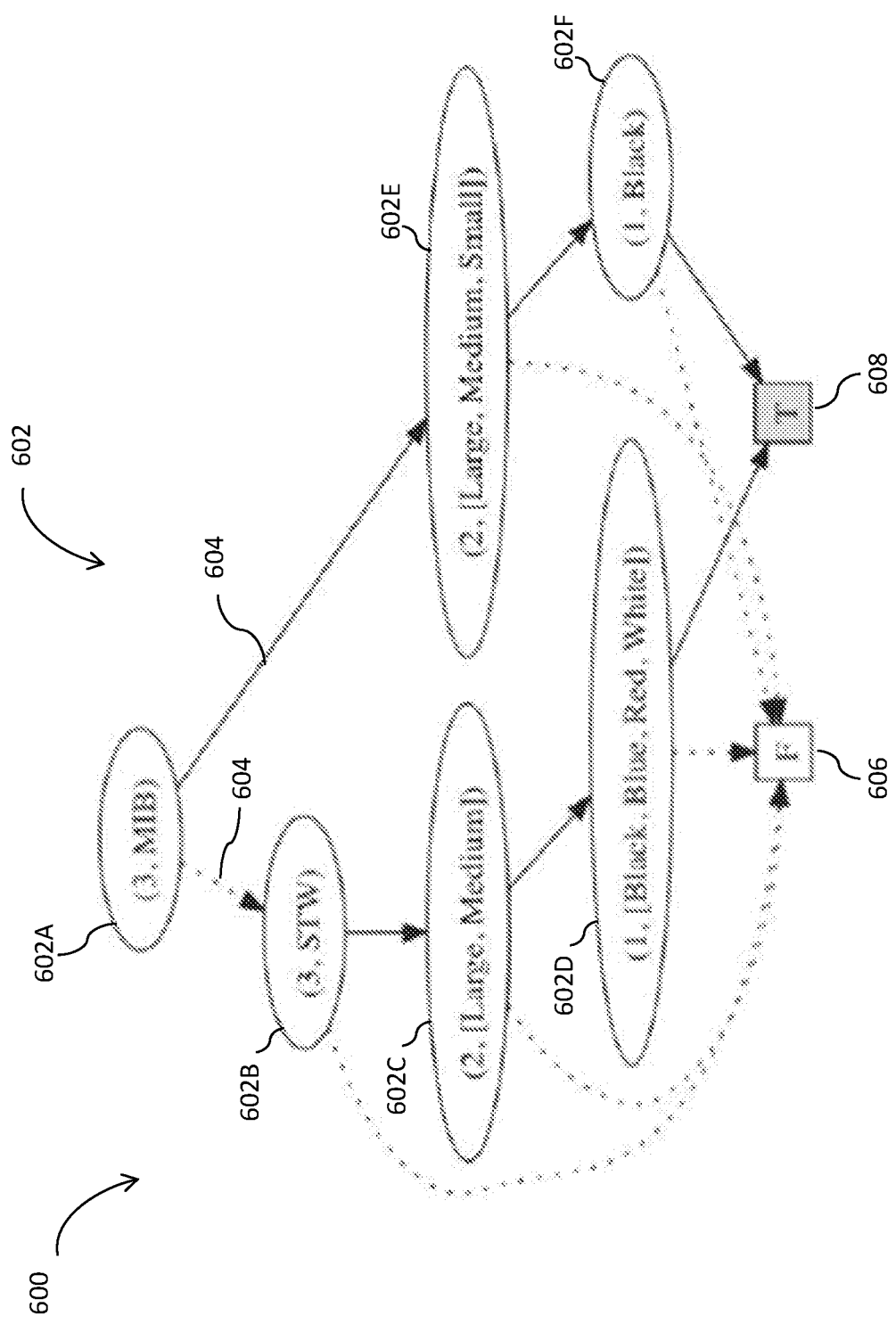
FIG. 6 shows a decision diagram of a VDD, which utilizes nodes representing sets of values, of the variant table of FIG. 3, in accordance with certain embodiments of the present disclosure.

FIG. 6 shows a VDD 600 that has nodes labeled with sets of values, instead of just a single value. A plurality of different sets can be used to label a set-labeled node, for example, real-valued intervals, discrete sets (sets of numeric values, string values, etc.), a mixture of numeric values and intervals, and wild card expressions. A VDD with set-labeled nodes can have fewer nodes than a VDD without set-labeled nodes for the same variant table. This is shown by comparing the VDD 600 of FIG. 6 and the VDD 500 of FIG. 5 where the VDD 600 has fewer nodes than the VDD 500.

The VDD 600 contains a plurality of nodes 602 and a plurality of links 604. Various links 604 lead to a first sink 606 (noted with an "F" for FALSE) and a second sink 608 (noted with a "T" for "TRUE). Some of the nodes 502 of the VDD 500 of FIG. 5 have been merged into various nodes 602. For example, in FIG. 6, the nodes 502E-H of FIG. 5 have been merged into one node, 602D. This reduces the number of nodes 602 in the VDD 600. These merged nodes can be referred to as set-labeled nodes, which merge the value-labeled nodes in FIG. 5 that have common right child subtables.

These set-labeled nodes are possible because some sets of variants can be described by defining a set of values for each column such that the overall set is comprised of all combinations obtained by choosing one value from each of the column sets. Such a set is called a c-tuple and it is the Cartesian product of the column sets. C-tuples may be used to describe an external restriction by a user (who selects or excludes values they are or are not interested in). The solution space (e.g., the set of all possible variants) may be described as a c-tuple defined by column domains, which are a set of all possible values for each column.

A variant table can be represented as c-tuples. For example, if a VDD has set-labeled nodes, as in FIG. 6, then each path from the root node to the sink TRUE corresponds to a c-tuple. Each path is comprised of all the nodes in the path that are selected (i.e., where the HI-link is followed). The VDD 600 of FIG. 6 has two such paths (e.g., two c-tuples): ({'MIB'}, {'Large'; 'Medium'; 'Small'}, {'Black'}) and ({'STW'}, {'Large'; 'Medium'}, {'Black'; 'Blue'; 'Red'; 'White'}). VDDs compress better when there are c-tuples with common tails. Multiple occurrences of a common tail can be represented by a single VDD node.

VDDs can be more quickly evaluated than the conventional variant table that the VDD represents. For example, the VDD 500 of FIG. 5 and the VDD 600 of FIG. 6 can be evaluated quicker than evaluating the uncompressed variant table 200. Evaluation techniques include querying variant tables via VDDs. For example, a variant table, via a VDD, can be queried via a filtering function quicker than a conventional variant table. Filtering can be used to identify inadmissible product features. It has been found that evaluation times (including filtering times) can be predicted based on the number of nodes.

VDDs can be used to generate variant tables in compressed, non-relational form, particularly, variant tables containing cells with multiple values (e.g., strings, real numbers (floats), integers, or decimals). Conversely, a VDD may also be constructed from a compressed, non-relational form by using the above-described decomposition. VDDs may (but not necessarily) share a similar data structure with a zero-suppressed binary decision diagram (ZDD). As such, algorithms given for ZDDs may apply to VDDs. Also, an MDD may be transformed to a VDD, which then provides the advantages of the binary data structure.

As described above, a VDD can be filtered quicker than an uncompressed variant table. Filtering returns all rows in a table that match certain criteria. The filtered result can be considered a VDD result set (VRS). In other words, a VRS is a compressed form of a set of records that results from a filtering. For example, in the VDD 500 of FIG. 5, if the VDD 500 is filtered by color="Red," the resulting VRS would contain the two records: imprint="STW" size="Medium" or "Large" and color="Red." In a relational database, a filter command could be an SQL query, such as: SELECT*FROM <variant table> WHERE <col1> IN <restriction1> AND . . . <last_col> IN <last_restriction>. Such a query is a complex query, particularly if the given restrictions in the WHERE clause are large sets. As described below, such a filtering query can be performed in a VDD for external restrictions in an amount of time that can be predictable (and guaranteed in certain embodiments) based primarily on the number of nodes in the VDD.

A filtering query can first be performed without an external restriction to yield an initial result set representing all rows in the VDD. Subsequent filtering queries (e.g., SELECT*FROM <VRS> WHERE) can then be performed against the initial VRS. Such a form of a SELECT statement encompasses many of the queries needed by an application accessing tables, particularly applications utilizing product variants, such as product configuration.

A VRS can also be used to obtain a domain restriction, which is the set of the values that still occur in the VRS for a particular column. This also has an SQL equivalent in the relational representation: SELECT DISTINCT <col> FROM <VRS>. The VRS can provide the domain restrictions of one or more columns in a single access.

Determination of a VRS for a filtering query involves inspecting nodes by retrieving the column to which a given node pertains to and the data it represents. The data associated with the node is subjected to a membership test against the restriction given for that column in the query (or if the query is alternatively a wildcard expression or other Boolean predicate, this is evaluated against the data of the node). The result of inspecting the nodes is a determination of whether a given node is to be marked "out" (i.e., cannot be chosen). Next, the number of solutions is counted. This can be done by accessing all nodes (where child nodes are accessed before their parents) and aggregating information of the child counts to the parent count. During this process, it is also determined which nodes are admissible (i.e., lie on a path from the root node to the sink TRUE and the given path contains no nodes marked as out.

When there is more than one variant table in a product model, the variant tables could be joined to form a table that explicitly lists all valid variants (discussed in more detail below). Alternatively, domain restrictions obtained from filtering of one variant table can be propagated to other variant tables that share a given column. The other variant tables can be filtered in turn. This propagation can be continued until no further restrictions occur. This state is called arc consistency. Arc consistency yields similar results in comparison to filtering the joined table. The very fast filtering possible with VDDs enables fast and cheap determination of arc consistency as well. VDDs can thus play a central role in configurators that use arc consistency as their main form or reasoning.

When the overall count of the rows in a VRS is performed, intermediate counts of the number of partial solutions (paths from an arbitrary node to the sink TRUE) are established for each node. These detailed counts of intermediate counts are often discarded after calculation. However, in a transformed form the intermediate counts enable direct access to a particular row in a VRS. For each node and VRS a "right count" is calculated. This is the intermediate count of partial solutions for the node minus the intermediate count of its LO-linked node. The right count can be used to quickly decide (starting from the root node) which node is on the path for the sought row. Iterating over a result set by sequentially getting each row through its index is substantially equally fast compared to directly iterating over the VDD via backtracking.

The size of a VRS depends on the number of nodes of the VDD and a chosen number of bits for each node to represent the VRS. As such, the VRS may only use less than 2K bytes to describe a result set of a variant table, including very large variant tables/VDDs with many nodes (e.g., ~1000 nodes, which may be adequate for many practical applications).

The VRS' small data footprint allows stateless communication with a server (e.g., a server does not have to maintain a "session" for the client) in applications such as configuration applications. The VRS would be small enough (e.g., a separate state representation comprised of an array with 2 or 3 bytes per node in the VDD) to be passed from a server to a client and back. For example, a client application could simultaneously and independently maintain a large number of VRSes without consuming much memory and without modifying or duplicating the underlying VDD. In a distributed, web environment several clients could asynchronously work with local VRS copies against a VDD stored at a server. In certain embodiments, a VRS can be used for multi-step undo/redo processes for filtering results. For example, a large number of filtered results can be stored and switched by an application. A user performing several filtering steps in succession can navigate backward and forward in a chain of the VRS—with almost instantaneous reaction in a user interface.

A VRS data structure is defined by either a reference to the VDD it pertains to, a pointer to a VDD in memory, or an external reference in the form of an universally unique identifier (UUID), which is a 128-bit number used to identify information in computer systems. The VRS can be further defined by an array of length n (i.e., number of nodes) with a number of bits for each node. The bits dedicated to each node can include bits representing status of the node (e.g., whether the node is excluded or selected as part of a previous query, whether the node is blocked (i.e., has no path to sink "TRUE" via non-blocked nodes), whether the node is on one or more paths in the VDD from root node to sink "TRUE". The remaining bits can be used to count the number of active parent nodes. It is noted that fewer or more bits could be used depending on the maximal expected number of active parent nodes that a node can have and/or the number of application-dependent flags that are reserved. Typically, 24 bits are used, but 16 bits can be used if no application dependent flags need to be reserved. The VRS is further defined by a count of the number of records in the VRS and representation of the count depends on the size of the table. For example, the count could be represented by a four byte integer, an eight byte integer (for very large tables), a logarithm of the actual number of records (in extreme cases), and the like depending on an operating environment.

A VDD is sorted naturally by the order in which an iterator (iterating over the initial VRS representing the entire table) iterates through rows. The first row is determined by following all HI-links. Then the last node in the current solution is replaced by the node its LO-link points to, if this not the sink 'F'. If there is no suitable LO-node, then backtracking to its parent occurs. In certain embodiments, this VDD order is just the lexicographical order imposed by the column order and the value order in the column domains used in the decomposition construction (for example as depicted in FIG. 3). If a different sorting order is to be imposed on a VDD, this can be done by declaring the VDD to be ordered, and adding one column that specifies the desired row number for each row. When accessing the VDD (also accessing the n-th row) this sorting information is used to present the VDD to the user as if the VDD was sorted in the desired order.

In certain embodiments, one or more columns with unique keys can be included in the variant table. For example, a unique key can include a value or combination of values that uniquely identifies the row the key references. The unique keys can be used to translate between a VDD and a variant table. For example, the variant table may have been sorted in a particular order, which will likely not be preserved in a VDD when the variant table is compressed using the above-described decomposition process. When a variant table has one or more unique keys, the columns with the unique keys can be split off from the variant table and be converted to a separate, ordered VDD. The unique keys can then act as a connection between the VDDs. It is noted that if a certain order (e.g., an ordering defined by a ordering of columns and values) of a variant table is important, the order of the decomposition process can be modified to preserve a desired order without adding a column of unique keys.

Figure 8:
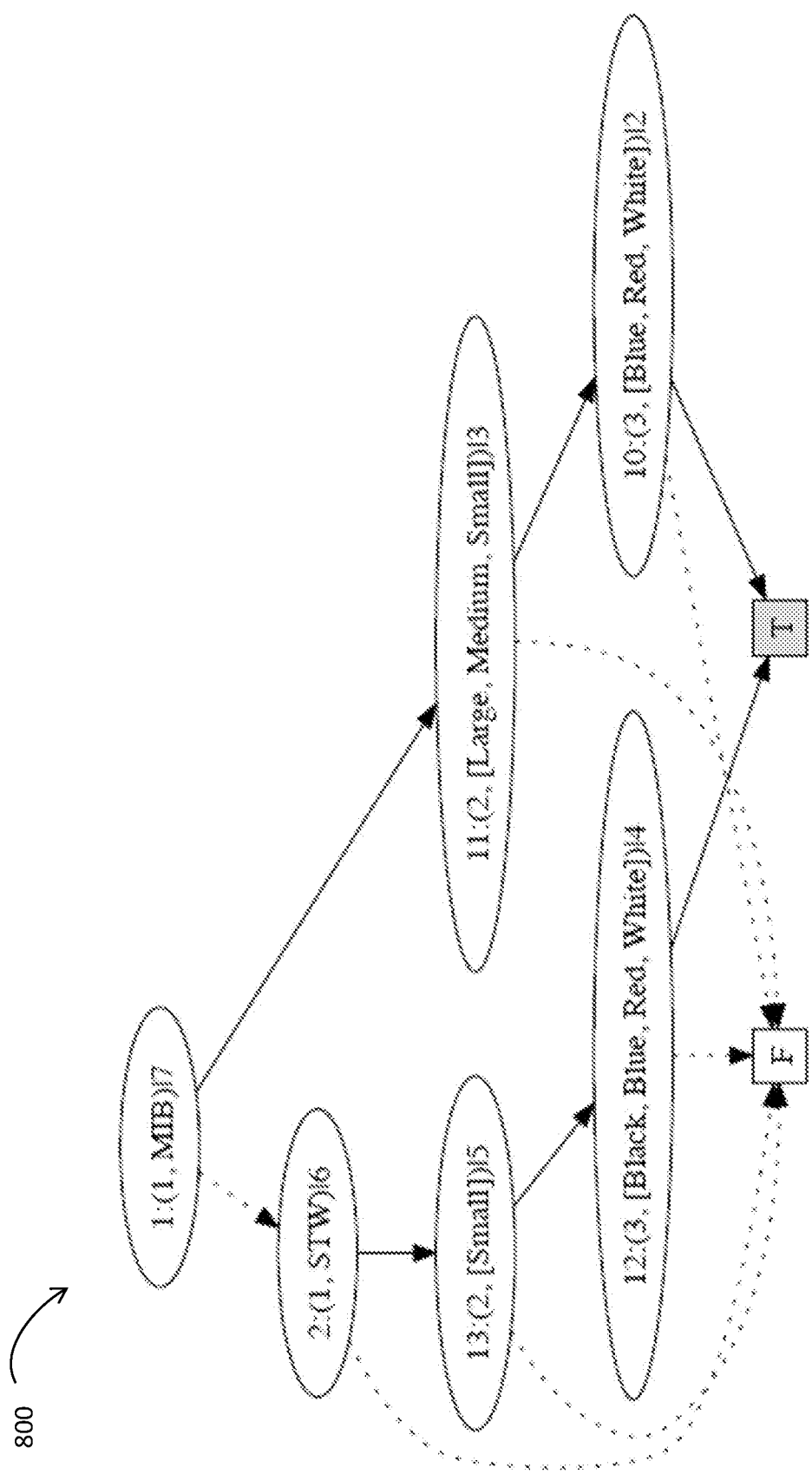
FIG. 8 shows a negative VDD of the negative variant table of FIG. 7, in accordance with certain embodiments of the present disclosure.

FIG. 7 shows an uncompressed negative variant table 700. FIG. 8 shows a negative VDD 800 of the negative variant table 700. A negative variant table is a table of disallowed (e.g., excluded) combinations of product features. For certain products, a negative variant table (e.g., list of excluded variations) is much shorter that a positive variant table (e.g., list of valid variants). Further, a negative table may be advantageous when the list of unique values for a feature is expected to grow over time. Using the variant table 200 of FIG. 3 as an example, adding more colors and imprints would necessitate expanding the variant table 200. But, if no new exclusions are expected, the negative variant table 700 would not change.

Negating a positive variant table (explained in more detail below) involves calculating a complement to the positive variant table with respect to a given domain restriction. In certain applications, a list of all potentially available values for all features in a variant able (e.g., global domains) is predefined and available to the application separate from the variant tables it maintains. The complement in the negation process could be with respect to these global domains. Negating the variant table 200 of FIG. 2 yields the negative variant table of FIG. 7. It follows that a positive VDD (like the VDD 500 of FIG. 5) can be negated too.

An advantage for an application to maintain global domains and a negative table lies in being able to add to global domains without needing to update the negative tables. In certain applications, only the positive form of a variant table can be processed. Generating a positive variant table may require negating a negative variant table to obtain a positive variant table. As such, it may be important to be able to negate a table quickly and predictably. This can be accomplished at the VDD level. VDD negation enables speed and predictability and will allow accepting negative variant tables where positive variant tables are needed. Further, VDD negation can compress a VDD further by negating the table twice (e.g., double negation) if the VDD was constructed by other means (e.g., an existing MDD, c-tuples that are not an optimal compression). Further, a negative table can be filtered directly, which may involve calculating the "free features" (i.e., values that do not occur in any remaining invalid variants and explanations).

The following exemplary steps can be used to negate a VDD such as a VDD produced using the approaches described above. The disclosed steps refer to a VDD that has been first reduced to merge nodes to set-labeled nodes, such as the VDD 600 of FIG. 6 which is a reduced, merged VDD for the VDD 500 of FIG. 5. The result of the negation process is the negative VDD 800 of FIG. 8, which has set-labeled nodes. As a set-labeled node is equivalent to a chain of value-labeled nodes linked by LO-links, the step of first constructing a reduced VDD with merged nodes is not necessary but is done so here to simplify explanation of the negation process. The negation process assumes that two nodes that are linked via a LO-link pertain to the same column. Nodes are identified with their set label. An exemplary negation process follows the steps described below. For ease of depiction, HI-links will be denote by "–>" and LO-links by "~>."

Step 1: For all columns except the first column, provide a node representing the column's domain. The LO-link will point to the sink FALSE, and the HI-link will point to the node for the domain of the following column, except that the node for the last column will point to the sink 'T'. In FIG. 6, a chain of nodes is created (where LO-links point to sink FALSE) {'Large', 'Medium', 'Small'}–>{'Black', 'Blue', 'Red', 'White'}–>'T'.

Step 2: Negate the two nodes in FIG. 6 pertaining to the last column (i.e., color) by complementing their set label. The node labeled {'Black', 'Blue', 'Red', 'White'}, is replaced with a node with an empty node (i.e., a node with the empty set as its label). The node labeled {'Black'} is replaced with a node labeled {'Blue', 'Red', 'White'}.

Note that steps 3, 4, and 5 apply only to nodes not in the last column. The set-labels of these nodes are not complemented.

Step 3: For the root node and all nodes that are the target of a HI link, prepare a new last LO-node, which has as its set-label the complement of the set union of all the labels in the chain of nodes reachable from it via LO-links. In FIG. 6, the chain of LO-links from the root node is: {'MIB'}~>{'STW'}~>'F'. The union of the set labels is {'MIB', 'STW'}, and its complement is the empty set. All nodes for the second column in FIG. 6 have the sink 'F' as their LO-link. The union to be calculated for each such node is just the label of the node itself. The complement for {'Large', 'Medium'} is {'Small'}. The new last node for the node {'Large', 'Medium'} is {'Small'}–>{'Black', 'Blue', 'Red', 'White'} (provided in step 1). The new last LO node for {'Large', 'Medium', 'Small'} is an empty node, as its complement is empty.

Step 4: For the next to last column, which is the size column FIG. 6, negate the first node labeled {'Large', 'Medium'}. This node is considered to be empty (labeled with the empty set) as the negation of its HI-Link is empty (determined in step 2). Replace the empty by its prepared last LO-link {"Small"}–>{'Black', 'Blue', 'Red', 'White'} as described above. Negate the other node labeled {'Large', 'Medium', 'Small'} in FIG. 6 by replacing the node with a node with the same label but with a HI-Link to the negated HI-link: {'Large', 'Medium', 'Small'}–>{'Blue', 'Red', 'White'}. The last LO-link for the node {'Large', 'Medium', 'Small'} was empty and does not need to be added.

Step 5: For the first column, the HI-link of the root node is replaced by letting the root node point to the negation of its HI-link, which is {'Large', 'Medium', 'Small'}. Its LO-link {'STW'} is nonempty and points to the negation of its HI-Link {'Small'}.

FIG. 8 shows the final result of the above-described negation process. Such negation will add at most one set-labeled node for each node considered for negation plus potentially one node for each column domain (except the first) even if the negative variant table it represents is much larger than the table being negated. Being able to quickly and predictably negate a VDD is important to be able to negate dynamically against the restriction of a query as explained above. Negation is also useful to filter a negated table directly the same way as was described for a positive table. The VRS for a query to a negative table is a list of all invalid variants that fall within the domain restrictions of that query. Domain restrictions resulting from this query are complemented against the global domain, and any value in this complement cannot occur in one of the remaining invalid tuples. This means that it can be readily assigned without the possibility of this leading to an invalid solution based in further other choices. Such a value is called a "free feature" as noted above.

Although this disclosure describes VDDs and negative variant tables in the context of tables for product variants, aspects of the present disclosure are useful in many types of databases includes those involving large tables. Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

What is claimed is:

1. A system for increasing computing efficiency, the system comprising:
   a memory having a variant table stored thereon; and
   a compiler configured to compress the variant table into a variant decomposition diagram (VDD) by decomposing the variant table into a first subtable comprising a plurality of rows that do not comprise a first value and decomposing the variant table into a second subtable comprising cells not within a root node and the first subtable, the VDD comprising a plurality of nodes and links.

2. The system of claim 1, wherein the compiler is configured to compress the variant table into the VDD by recursively decomposing the variant table into a plurality of subtables.

3. The system of claim 1, wherein the compiler is configured to negate the VDD into a negative VDD.

4. The system of claim 3, wherein the complier is configured to negate the negative VDD to generate a positive VDD.

5. The system of claim 1, wherein the compiler is configured to negate the VDD into a negative VDD by calculating complements to the nodes of the VDD.

6. The system of claim 1, wherein the variant table comprises a plurality of c-tuples.

7. The system of claim 1, wherein the VDD includes a plurality of set-labeled nodes.

8. The system of claim 1, wherein the variant table comprises a column with a set of unique keys corresponding to an order of the variant table.

9. The system of claim 1, wherein the compiler is configured to filter the VDD to generate a VDD result set (VRS).

10. The system of claim 9, wherein VRS is stored in a server.

11. The system of claim 10, wherein the VRS is communicated to a client application.

12. The system of claim 9, wherein the VRS is stored in a client device.

13. A method for increasing computing efficiency, the method comprising:
   compressing, using one or more processors, a data table into a variant decomposition diagram (VDD) by recursively decomposing the variant table into a plurality of subtables, the VDD comprising a series of nodes and links;
   filtering, using the one or more processors, the VDD to generate a VDD result set (VRS); and
   communicating the VRS to a client application.

14. A method comprising:
   compressing a variant table to create a variant decomposition diagram (VDD) by recursively decomposing the variant table into a plurality of subtables; and
   negating, using one or more processors, the VDD to generate a negative VDD.

15. The method of claim 14, further comprising:
   negating, using the one or more processors, the negative VDD to generate a positive VDD.

16. The method of claim 14, wherein the complier is configured to negate the negative VDD to generate a positive VDD.

* * * * *